United States Patent

Hirano et al.

[11] 4,217,656
[45] Aug. 12, 1980

[54] ELECTRONIC CALCULATOR

[75] Inventors: Reiji Hirano, Yokohama; Koichi Mochizuki, Tokyo; Tokio Yasui, Tokyo; Jyoji Shimazu, Tokyo, all of Japan

[73] Assignee: Canon Kabushiki Kaisha, Tokyo, Japan

[21] Appl. No.: 879,506

[22] Filed: Feb. 21, 1978

Related U.S. Application Data

[63] Continuation of Ser. No. 704,752, Jul. 12, 1976, abandoned.

[51] Int. Cl.² .......................................... G09B 19/02
[52] U.S. Cl. .................................. 364/710; 35/31 C; 364/737
[58] Field of Search ............... 235/306; 364/710, 737; 35/31 R, 31 C

[56] References Cited

U.S. PATENT DOCUMENTS

| | | | |
|---|---|---|---|
| 2,700,755 | 1/1955 | Burkhart | 235/306 |
| 3,584,398 | 6/1971 | Meyer et al. | 45/31 C |
| 3,612,843 | 10/1971 | Aptroot-Soloway | 235/306 |
| 3,699,667 | 10/1972 | Gomez | 35/31 C |
| 3,787,988 | 1/1974 | Nakajima et al. | 35/31 C |
| 3,854,226 | 12/1974 | Divine et al. | 35/31 C |
| 3,925,909 | 12/1975 | Duncan | 35/31 C |
| 3,947,976 | 4/1976 | Hafel | 35/31 C |
| 3,974,575 | 8/1976 | Duncan | 35/31 C |
| 4,016,411 | 4/1977 | Genin | 364/710 |
| 4,114,294 | 9/1978 | Marmer | 34/31 C |
| 4,126,949 | 11/1978 | Simone | 35/31 C |

Primary Examiner—Charles E. Atkinson
Attorney, Agent, or Firm—Fitzpatrick, Cella, Harper & Scinto

[57] ABSTRACT

An electronic calculator comprises a keyboard for receiving numerical data, storage registers for storing the numerical data, a processor unit for processing the numerical data stored in the storage registers, a display unit for visually displaying the numerical data, a blocking circuit for blocking the visual display of a computed result from the processor unit, and a releasing circuit to discontinue the blocking of the visual display of the result, thereby causing the operator of the calculator to not know the result until receiving instructions.

12 Claims, 5 Drawing Figures

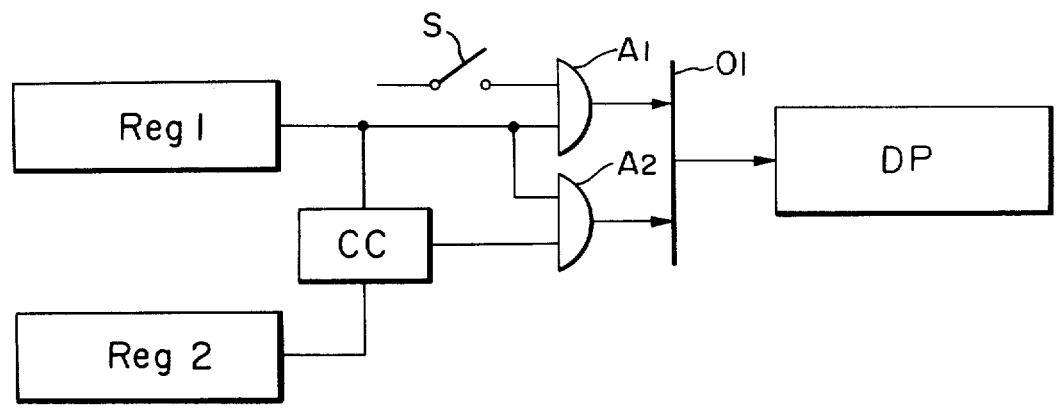
FIG. 1
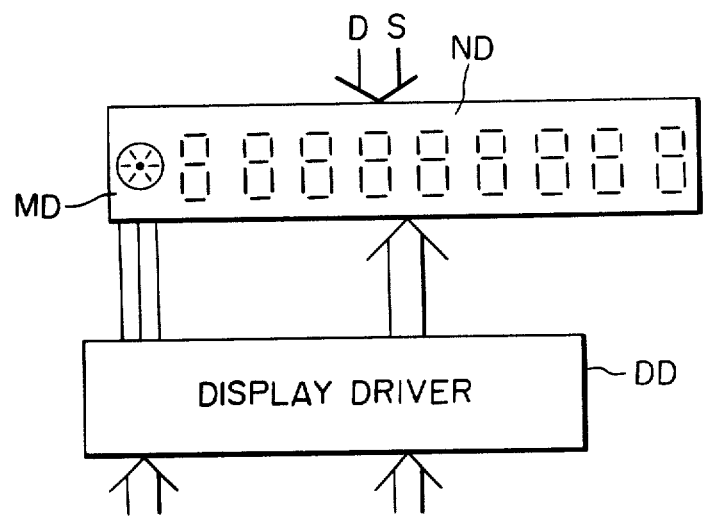
FIG. 4
FIG. 5

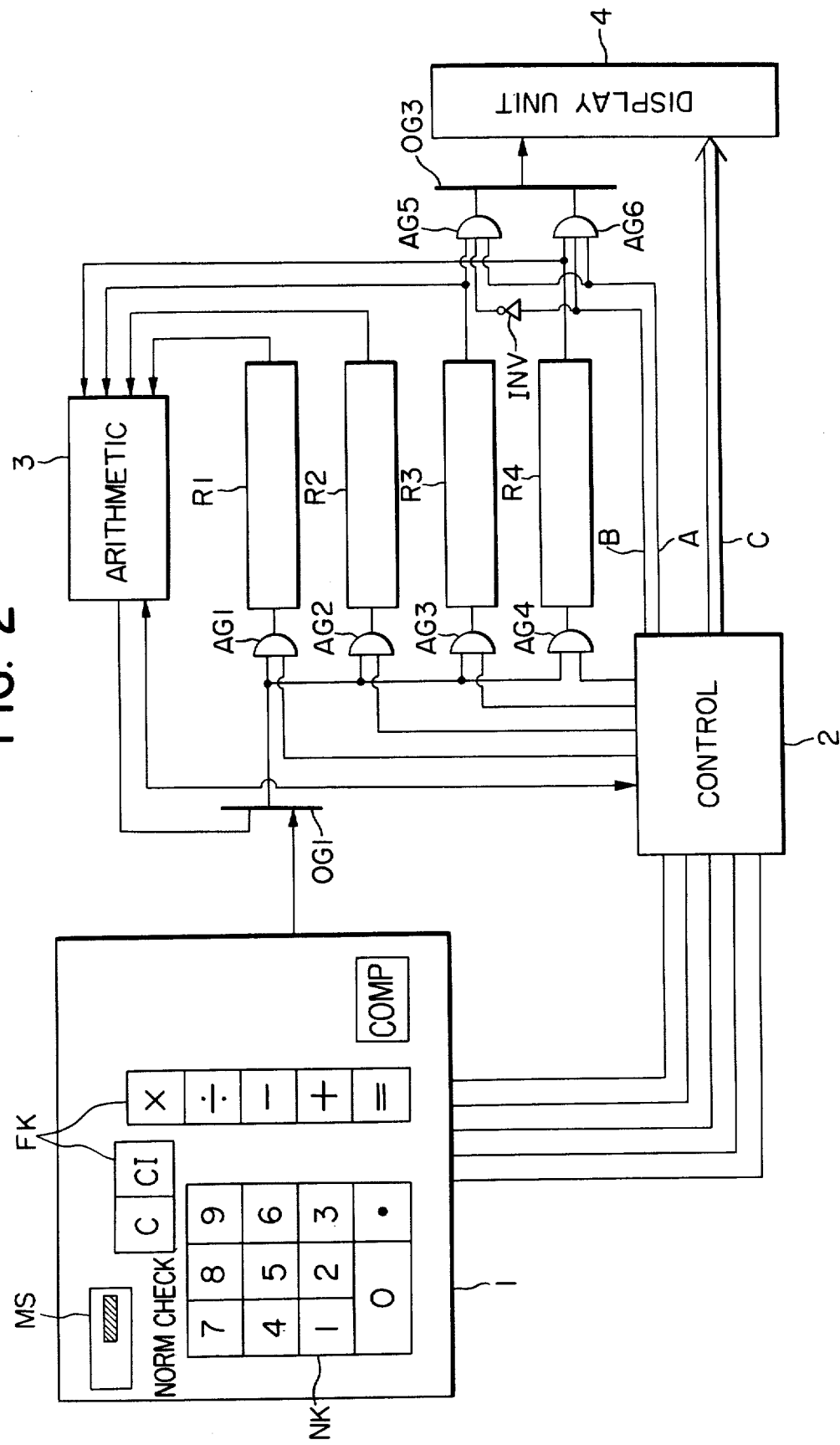

ELECTRONIC CALCULATOR

This is a continuation, of application Ser. No. 704,752, filed July 12, 1976 now abandoned.

BACKGROUND OF THE INVENTION

1. Field of the Invention

The present invention relates to an electronic calculator, and more particularly to an electronic calculator structured not to provide the result of calculation immediately after the execution of calculation but to provide the same only after certain conditions are satisfied.

2. Description of the Prior Art

In a conventional small electronic calculator, the result of a calculation is immediately indicated in its visual display by pressing an EQUAL key (=), and this convenience has stimulated the rapid penetration of such calculators into various businesses.

Such electronic calculators, however, are evidently undesirable for school children from an educational standpoint. The availability of such handy electronic calculators will lead to insufficient training for calculations with figures on paper or mental arithmetic, and eventually give rise to people who are unable to satisfactorily perform daily calculations as in shopping without such electronic calculators.

SUMMARY OF THE INVENTION

An object of the present invention is to provide a small electronic calculator for educational use which is not associated with the above-mentioned drawback but which achieves better teaching effects.

Another object of the present invention is to provide a small electronic calculator enabling one to know whether or not the result of a calculation coincides with the answer obtained by other calculating methods, such as a calculation with figures on paper.

A still further object of the present invention is to provide a small electronic calculator which is capable of comparing figures which are believed to be the answer of a calculation with the correct result of the calculation, upon input of such figures into said calculator, and indicating the result of such comparison.

A still further object of the present invention is to provide a small electronic calculator which is capable, instead of indicating the result of a calculation immediately upon execution of the calculation by the entry of operands, of indicating said result only when the presumed answer applied to the calculator coincides with the result of calculation.

A still further object of the present invention is to provide an electronic calculator for school children which is provided with lock means in the information output mechanism and is structured to provide an output such as the result of a calculation when said lock means is released.

A still further object of the present invention is to provide an electronic calculator of the above-mentioned structure which may also be used as an ordinary electronic calculator by operating the switching means.

A still further object of the present invention is to provide a small electronic calculator which is capable, when figures presumed to be the answer of a calculation are entered in the calculator do not coincide with said result, of indicating that there is an error.

Still other objects of the present invention will be made clear from the following description of the embodiments of the present invention with particular reference to the attached drawings.

BRIEF DESCRIPTION OF THE DRAWINGS

FIG. 1 is a block diagram showing the basic composition of the electronic calculator of the present invention;

FIG. 2 is a block diagram showing an embodiment of the electronic calculator of the present invention;

FIG. 4 is a drawing showing details of a part of the displaying unit; and

FIGS. 5(a)–(e) are drawings for use in explaining the function of an embodiment of the present invention.

DESCRIPTION OF THE PREFERRED EMBODIMENTS

Figure 3:
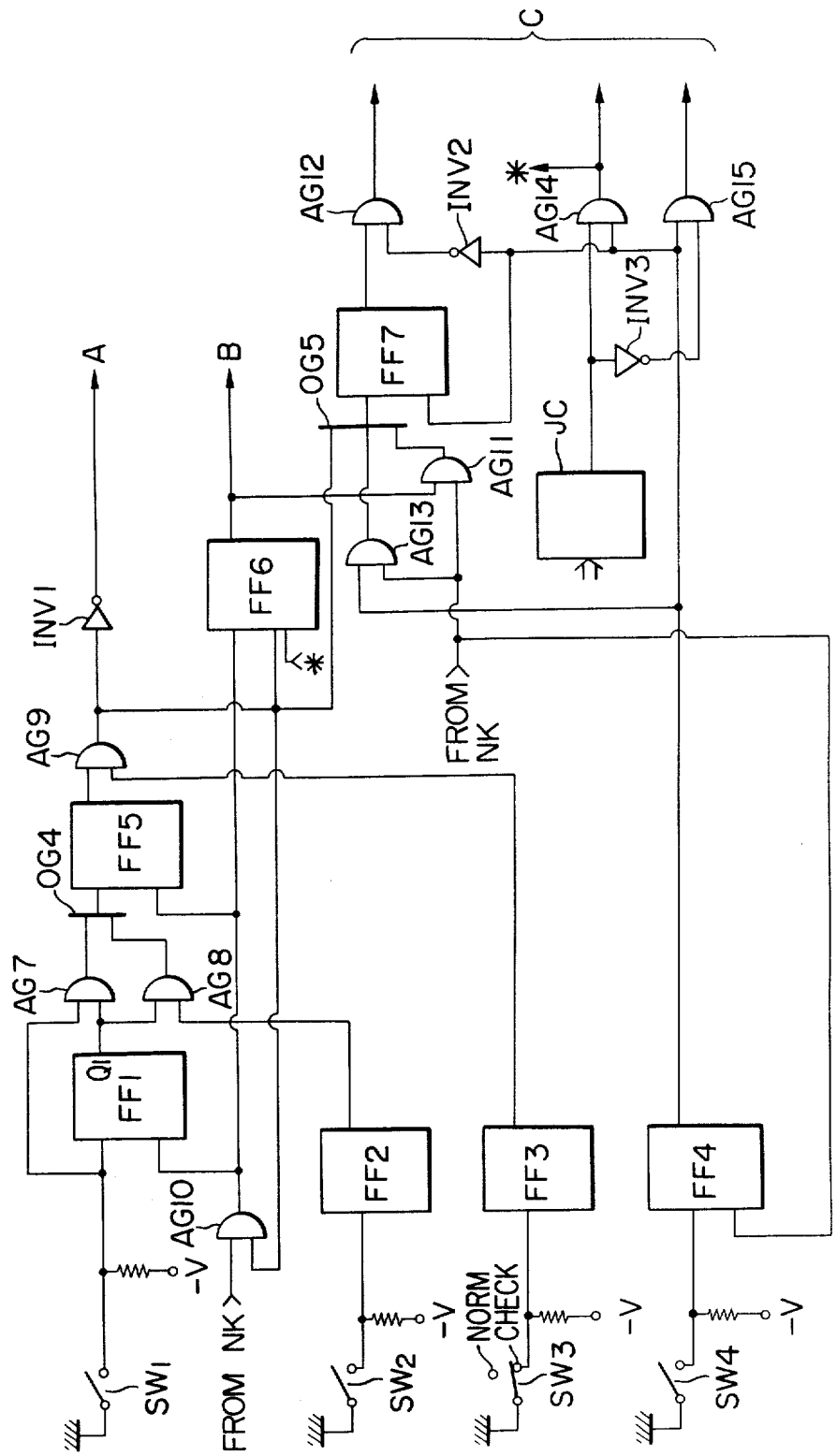
FIG. 3 is a block diagram showing the essential part of the control circuit 2 shown in FIG. 2.

Now referring to FIG. 1 indicating the basic composition of the electronic calculator of the present invention, Reg 1 is a register for memorizing numerical information processed by means which is not indicated in the drawing, Reg 2 is an another register for storing numerical information which is to be compared with the numerical information to be stored in said register Reg 1, CC is a comparing circuit which compares the numerical information stored in said register Reg 1 with that stored in said register Reg 2 and generates a high (H) level signal when these two pieces of information mutually coincide, and S is switching means for selecting the display control of the result of calculation.

Said switching means S, when closed, enables an AND gate A1 to allow the transmission of the contents of said register Reg 1 through an AND gate A1 and an OR gate O1 to a displaying unit DP thereby allowing immediate display of said contents. On the other hand when said switch S is open, the AND gate A1 is disabled and the contents of said register Reg 1 are transmitted through an AND gate A2 and the OR gate O1 when said comparing circuit CC develops an H level output signal.

The displaying unit DP is capable of display by means of a segment type display device or in printing.

The above-described electronic calculator functions as an ordinary electronic calculator when the switch S is closed, whereby the contents memorized in the register Reg 1 are transmitted, upon depressing an EQUAL (=) key, through the AND gate A1 and the OR gate O1 and visually displayed on the displaying unit DP. When said switch S is opened, however, the result of calculation stored in said register Reg 1 is not displayed but remains locked even when the EQUAL (=) key is actuated.

In this state figures representing a presumed answer of a calculation, which are obtained separately by calculation on paper or mental arithmetic, are supplied through a keyboard (not shown) and stored in said register Reg 2.

Upon a successive instruction for comparison received from said keyboard, said comparing circuit CC performs the comparison of the figure thus stored in the register Reg 2 with the result of calculation stored in said register Reg 1, and when the contents of said registers Reg 1 and Reg 2 mutually coincide, opens the AND gate A2, thus allowing the display of said result of calculation and indicating that the answer of said calculation on paper or mental arithmetic is correct. The result of calculation will not be displayed in the case said contents do not mutually coincide, and, in such a case, the procedure of performing a separate calculation on paper or by mental arithmetic, the input of the answer through the keyboard and the comparison of the results thereof are repeated until two results coincide with each other. Thus, in case of the use of the electronic calculator for school children, an emphasis is given to the function of verifying the results of calculations, and the effectiveness as a teaching machine is achieved by a composition wherein the lock means such as AND gates A1, A2 are released only when certain conditions are met. Also it is to be noted that various variations and modifications are easily applicable to the foregoing embodiment, such as structure wherein the switch S is only operable by a key which is to be held by a teacher, a structure wherein the coincidence of two results is merely indicated by a mark such as a circle O instead of a numerical output or the non-coincidence of the results is indicated by a mark such as a cross X, or a structure wherein the displaying unit indicates the contents of register Reg 2 which is provided through the key-board by the user of the electronic calculator.

In the following there will be given a detailed description of an embodiment of the small electronic calculator according to the present invention.

Referring to FIG. 2 showing the details of said embodiment, a keyboard 1 is provided with a plurality of operating keys, including numerical keys NK for the input of the numerals 0–9 and a decimal point, function keys FK for the input of instructions for various calculations, input of instruction for executing such calculation instructions and input of an instruction for clearing the memory, a mode switch MS for selecting a particular processing in the electronic calculator, and a key COMP for executing the comparison of data.

Numeral 2 designates a control circuit, which identifies the input signal from the keyboard 1 and the state of a calculating circuit as to be explained later, controls the AND gates AG1, AG2, AG3 and AG4, performs the data input from the keyboard 1 and register R1, R2, R3 or R4 to register R1, R2, R3 or R4, and controls the calculating circuit 3 thereby executing calculation on the data stored in said registers R1, R2, R3 and R4. Furthermore said control circuit 2 controls the AND gates AG5 and AG6 to select the data transferred from the registers R3 and R4 to the display unit 4. OG1 and OG3 indicate OR gates while INV designates an inverter.

Now referring to FIG. 3 showing a block diagram of a part of said control circuit 2, SW1 is a switch which is closed upon actuation of the keys instructing, for example, addition (+), subtraction (−), multiplication (×) or division (÷). The closing of said switch changes the potential level applied to the set terminal of a flip-flop FF1 from L(−V) to H(O), thus generating an H level output at the output terminal Q1 of said flip-flop FF1.

SW2 is a switch which is closed upon actuation of EQUAL key (=) indicating the execution of instructions and which, upon closing thereof, applies an H level signal to a flip-flop FF2 for a temporary memory, thus changing said flip-flop to its set state.

SW3 is a key representing the mode switch MS, which, when closed, allows the electronic calculator to perform ordinary function while it is actuated when open, to allow the electronic calculator to perform a different function. A flip-flop FF3 assumes its set or reset state in response to the operation of said key SW3.

SW4 corresponds to the key COMP for executing the comparison of data. A flip-flop FF4 is set by the closing of said switch SW4 while it is reset upon detection of a numerical input.

The output terminal Q1 of the flip-flop FF1 which is set by the actuation of switch SW1 is connected to an input terminal of AND gates AG7 and AG8. Thus, upon actuation of said switch SW1, the AND gate AG7 is opened to allow the transmission of output signals of flip-flop FF1 through said AND gate AG7 and OR gate OG4 to the set terminal of a flip-flop FF5. Also the set terminal of said flip-flop FF5 receives a signal transmitted through the AND gate AG8 which is opened by the output signal of the flip-flop FF2 which is in turn set by the EQUAL (=) key (SW2) for executing instructions, and also through the OR gate OG4.

The output terminal of said flip-flop FF5 is connected to an AND gate AG9 which is to be opened by the output signal of the flip-flop FF3 of which output is changed to H level upon actuation of said switch SW3, and the output signal of said AND gate AG9 is supplied through an inverter INV1 to an input terminal of AND gates AG5 and AG6 shown in FIG. 2.

An AND gate AG10 receives on one input terminal thereof the output signal of said AND gate AG9 and on the other input terminal thereof a numerical input detection signal, and changes the flip-flops FF1 and FF5 to the reset state thereof and the flip-flop FF6 to its set state. The output signal of said flip-flop FF6 is supplied directly to the AND gate and also through an inverter INV to the AND gate AG5, thus selecting either the register R3 or R4 for data display by the displaying unit 4. Also, the output signal of flip-flop FF6 is transmitted through an AND gate AG11 to be opened by the signal from the numerical keys NK and through the OR gate OG5, and changes a flip-flop FF7 to its set state, and the set signal thus obtained is transmitted through an AND gate AG12 to the displaying unit 4, thus driving an indicator MD provided in the displaying unit 4 as shown in FIG. 5 to indicate a dot (.).

Said flip-flop FF7 is changed to its set state either by the numerical input detection signal to be applied through an AND gate AG13 to be opened by the H level signal of the flip-flop FF4 which is set by the COMP key and further through the OR gate OG5, or by the output signal of the AND gate AG9 to be applied through the OR gate OG5.

Further, the output signal of said flip-flop FF4 is supplied directly to the reset input terminal of the flip-flop FF7 and an input terminal of AND gates AG14 and AG15, and indirectly through an inverter INV2 to the AND gate AG12.

The other input terminals of said AND gates AG14 and AG15 receive, directly and through an inverter INV3 respectively, the output signal of a judging circuit JC which compares the contents of the register R3 which memorizes the result of a calculation under the control of the control circuit 2, and the contents of the register R4 which memorizes the input figures from the keyboard 1 and develops an output signal indicating the result of such comparison. Thus said AND gates AG14 and AG15 drive the mode indicator MD shown in FIG. 4, performing a display of a mark identifying the result of comparison.

The output signal of said AND gate AG14 is also supplied to the reset terminal of said flip-flop FF6 as a reset signal therefor.

Now referring to FIG. 4 showing a block diagram of the displaying unit 4, a display driver DD decodes the numerical signals supplied through the OR gate OG3 and the state indicating signals supplied from the control circuit 2, and supplies the information signals to a mode display MD for indicating a displaying state and to a numerical display ND provided together with said mode display MD, for displaying numerals. Said displays MD and ND perform, upon reception of such information signals, dynamic display by way of coincident selection with the digit signals.

The operation of the above-mentioned embodiment will be explained in the following.

When the mode key MS is placed in the normal (NORM) position, the illustrated electronic calculator displays the result of calculation immediately after the execution of said calculation in a manner similar to the calculator disclosed for example in U.S. Pat. No. 3,819,921.

On the other hand, when the mode key MS is placed in the CHECK position, the electronic calculator performs a function explained in the following description which will be made, for the purpose of clarity, on an example of multiplication 12.3×2.4.

At first a CLEAR (C) key is actuated to initialize the internal state of the calculator.

Successively, the input of an operand is achieved by actuating the keys (1) (2) (.) (3) among the numerical keys NK in succession. This operation is detected by the control circuit 2, which allows the input of above-mentioned operand 12.3 into the registers R1 and R3 through the OR gate OG1 and gates AG1 and AG3. The data thus stored in said register R3 is displayed on the displaying unit 4 through the AND gate AG5 which is maintained open as the flip-flops FF5 and FF6 are in the reset state thereof, and further through the OR gate OG3.

Upon successive actuation of a MULTIPLICATION (×) key among the function keys FK, the instruction for multiplication is memorized in a memory circuit (not shown) in said control circuit 2, and the flip-flop 1 is shifted to its set state.

Upon successive input of another operand 2.4 on the keyboard 1, the control circuit 2 performs the storage of said operand into the register R2 and also into the register R3, the previous contents of which have been cleared. In this manner the input data is again displayed on the displaying unit 4. Upon the input of said operand a numerical input detection signal is applied to the AND gate AG10, but the output signal thereof remains at the L level since the other input terminal thereof is still receiving an L level signal from the flip-flop FF5 through the AND gate AG9, so that the flip-flops FF1, FF5 are not shifted to their respective reset states. Also, the numerical input detection signal is supplied to the AND gates AG11 and AG13 but the flip-flop FF7 is not shifted to its set state as said AND gates remain closed.

Upon application of an instruction, for example by an EQUAL (=) key for executing the previously memorized instruction of multiplication, the operand memorized in the register R1 and the other operand memorized in the register R2 are processed through in the calculating circuit 3 under the control of said control circuit 2, and the result of the calculation is forwarded through the OR gate OG1 and AND gate AG3 and, in turn stored in the register R3.

At the same time, upon the actuation of said EQUAL (=) key, the H level output signal of the flip-flop FF1 is transmitted through the AND gate AG8 which is opened by the H level signal of the flip-flop FF2 which, in turn, is shifted to the H level output state by the operation of said EQUAL key, and further through the OR gate OG4 to shift the flip-flop FF5 to its set state. In this state, since the AND gate AG9 is maintained open by the output signal of the flip-flop FF3 which is in turn maintained in its set state by the mode switching key SW3 placed at the CHECK position, the AND gates AG5 and AG6 are closed by the H level output signal of the flip-flop FF5 inverted by the inverter INV1, thus interrupting the supply of the result of the calculation to the displaying unit 4. In this manner, the result of the calculation is not displayed immediately after the calculation. Also the H level output signal of the flip-flop FF5, which is attained by the operation of said EQUAL (=) key, shifts the flip-flop FF7 to its set state, and the AND gate AG12 is maintained open by the L level output signal of the flip-flop FF4 inverted by the inverter INV2. Thus the output signal of said flip-flop FF7 is applied to the display driver DD through said AND gate AG12, thus driving the mode display MD and performing a display of a dot (.) as shown in FIG. 5(a).

When the electronic calculator takes the above-mentioned state, figures separately obtained by mental arithmetic, calculation on paper or an abacus by the user of the calculator, for instance figures 23.41 in the foregoing example, are given to the keyboard 1, and stored, under the control of said control circuit 2, in the register R4 through the OR gate OG1 and AND gate AG4.

Upon the input of the first digit "2" of said figure, the control circuit 2 detects the input of the numerical signal and supplies an H level signal to the AND gate AG10, of which the output signal changes, due to the H level output of the AND gate AG9, from L level to H level, thus shifting the flip-flop FF6 to its set state and the flip-flops FF1 and FF5 to the reset state thereof. The flip-flop FF6 thus changed to its set state supplies, through the inverter INV, an L level signal to the AND gate AG5 and also supplies an H level signal to the AND gate AG6. Simultaneously the inverter INV1 which supplies the same signal level to the AND gates AG5 and AG6, develops an H level output signal, thus causing the AND gate AG5 to be closed and the AND gate AG6 to be opened. Consequently the data 23.41 to be compared with the result of calculation is displayed on the numerical display ND in combination with the dot (.) on the mode display MD as shown in FIG. 5(b).

Upon completion of the above-mentioned operation, the COMP key is actuated to execute the comparison of the result of calculation stored in the register R3 and the comparative data stored in the register R4 in the calculating circuit 3 under the control of the control circuit 2, and the result of such comparison is judged in the judging circuit JC, which generates an L level signal when the comparative figures do not coincide with the result of calculation and generates an H level signal upon coincidence between the two. In the case of the above-mentioned figures representing an example of no coincidence, there is generated an L level signal which is applied, after inversion by the inverter INV3, to the AND gate AG15, which, as maintained open by the output signal of the flip-flop FF4 in turn maintained at H level by the above-mentioned COMP key, allows the transmission therethrough of a signal indicating the presence of an error in the comparative figures to the display driver DD, thus driving the mode display MD and performing a display of cross (X) in combination with the numerical figures as shown in FIG. 5(c). The previous dot display (.) is erased as the flip-flop FF7 is reset by the operation of COMP key.

Upon repeated input of renewed comparative figures, for example 29.52, the register R4 is reset and memorizes said renewed figures 29.52. In this case, upon input of the first digit of said figures, the numerical input is detected to cause resetting of the flip-flop FF4, thus erasing the display of the cross (X). Simultaneously the H level signal from the flip-flop FF6 and the input detection signal cause the AND gate AG11 to generate an H level signal, which shifts the flip-flop FF7 to its set state, thus performing the display of a dot (.) again and the display of renewed comparative figures upon completion of the input thereof as shown in FIG. 5(d).

Successive actuation of the COMP key executes the comparison of the contents of registers R3 and R4 in the above-mentioned manner, and the result of such comparison is judged by the judging circuit JC, which generates an H level output signal as there is coincidence between the two in the above-mentioned example. At this stage the AND gate AG14 is opened as the flip-flop FF4 is set by the operation of COMP key. Said H level signal is transmitted through the AND gate AG14 to the display driver DD, thus driving the mode display MD to perform a display of a circle (O). Also the flip-flop FF6 is reset by the output of AND gate AG14 to allow the display of the figures stored in the register R3, as shown in FIG. 5(e).

Although the result of judgement in the foregoing embodiment is indentified by the display of the mark O or X, it is to be understood that any other suitable form of display is employable for this purpose. Also in the foregoing embodiment the result of judgement is displayed on a separate digit of the segments, different from the numerical display digits, but it will also be possible for this purpose to use another display pattern other than numerals but realizable on an ordinary 7-segment numerical display which has a segment pattern of figure "8."

Furthermore, although the flip-flop FF6 is reset by the AND gate AG14 for switching the register to be connected to the display, such switching may be dispensed with if desirable. Also the display unit may be replaced by a suitable printer.

What is claimed is:

1. Electronic apparatus comprising:
    input means for entering numerical data and operational instructions;
    memory means for storing the numerical data;
    processing means for processing the numerical data stored in said memory means in response to said operational instructions;
    display means for providing a visual display of the processed numerical data;
    selecting means settable to a first state and a second state such that the display of numerical data processed in said processing means is enabled when said selecting means is in the first state; and
    means responsive to the second state of said selecting means for disabling the display of the processed numerical data.

2. Electronic apparatus according the claim 1 further comprising comparator means for comparing the processed numerical data with predetermined numerical data entered by said input means.

3. Electronic apparatus according to claim 2, wherein said comparator means includes means for producing a coincidence signal when coincidence exists between the processed numerical data and the predetermined data, and wherein said apparatus further comprises control circuitry responsive to the second state of said selecting means and to the coincidence signal for providing a display indication on said display means.

4. An electronic calculator comprising:
    input means for entering numerical data and operational instructions;
    memory means for storing the numeral data;
    processing means for processing the numerical data stored in said memory means in response to said operational instructions;
    display means for providing a visual display of the processed numerical data;
    means for selectively disabling the display of processed numerical data; and
    means for indicating that said display of processed numerical data is disabled.

5. An electronic calculator according to claim 4, further comprising means for comparing the processed numerical data with predetermined numerical data entered by said input means, and for subsequently enabling the display of said data when coincidence exists between said processed and predetermined data.

6. An electric calculator comprising:
    an input keyboard containing numeral keys for the input of numerical data into said calculator, function keys for the input of operation commands into said calculator and instruction keys for ordering the execution of instructions;
    registers for storing the numerical data;
    a display unit for indicating numerical data;
    a processing circuit for processing the numerical data stored in said registers according to the operation specified by said function keys;
    circuit means connected to said display unit for selectively disabling the display of the processed numerical data;
    means for indicating that said display of the processed numerical data is disabled;
    a comparing circuit for comparing, in response to the instruction given by said instruction keys, the processed numerical data with predetermined numerical data supplied through said keyboard; and
    an enabling circuit means connected to said display unit for enabling said display unit to display the processed numerical data when the comparison performed by said comparing circuit detects coincidence between the processed and predetermined data.

7. An electronic calculator according to claim 6, further comprising a circuit connected to said comparing circuit for erasing the processed data, when non-coincidence is detected by the comparing circuit.

8. An electronic calculator comprising:
    input means for entering numerical information and operational instructions;
    arithmetic operating means connected to said input means for performing arithmetic operations on the numerical information to produce result information in response to the operational instructions;
    display means for displaying the result information;
    a memory for storing result information;
    means for selecting between first and second operational modes;

first control means responsive to a selection of the first mode for controlling said arithmetic operating means to supply the result information to said display means;

second control means responsive to a selection of the second mode for controlling said arithmetic operating means to store result information in said memory;

third control means also responsive to a selection of the second mode for controlling said arithmetic operating means to perform arithmetic operations to compare the result information in the memory with numerical information subsequently entered by said numerical information input means; and fourth control means responsive to a comparison result from the arithmetic operating means controlled by said third control means for supplying or inhibiting the supply of said result to said display means.

9. Electronic apparatus comprising:

input means for entering numerical data and operational instructions;

arithmetic operating means connected to said input means for performing arithmetic operations on the numerical information to produce result information in response to the operational instructions;

a memory connected to said operating means for storing the result information;

first control means for controlling said operating means to perform arithmetic operations on numerical information including first and second operands and to supply result information from said arithmetic operating means to said memory;

second control means for controlling said operating means to perform arithmetic operations to compare the result information with numerical information subsequently entered by said numerical input means;

third control means connected to said arithmetic operating means and being responsive to a comparison result from said operating means, controlled by said second control means, for supplying or inhibiting the supply of said comparison result as an output signal of said arithmetic operating means; and display means responsive to either of said third control means and said input means for displaying the result information and comparison result information.

10. Electronic apparatus according to claim 9, further comprising fourth control means connected to said display means for controlling said display means to display a symbol representative of no-coincidence together with the numerical information received by the numerical input means when no coincidence occurs between the numerical information entered by the numerical input means and the result information stored in said memory.

11. Electronic apparatus according to claim 10, further comprising fifth control means responsive to renewed numerical information entered by the numerical input means for clearing the display of the symbol and the result information stored in said memory.

12. Electronic apparatus according to claim 9, further comprising means connected to said display means for causing said display means to display a symbol representative of coincidence together with the result information stored in said memory when coincidence occurs between the numerical information received by the numerical input means and the result information stored in said memory.

* * * * *